United States Patent Office 3,436,425
Patented Apr. 1, 1969

3,436,425
PROCESS FOR THE CONTINUOUS PREPARATION OF ADDITION PRODUCTS OF PROPYLENE OXIDE
Werner Stein, Erkrath-Unterbach, and Wilfried Umbach, Langenfeld, Germany, assignors to Henkel & Cie G.m.b.H., Dusseldorf-Holthausen, Germany, a corporation of Germany
No Drawing. Filed July 14, 1967, Ser. No. 653,359
Claims priority, application Germany, Sept. 1, 1966, H 60,398
Int. Cl. C07c 41/02, 41/10
U.S. Cl. 260—613   7 Claims

ABSTRACT OF THE DISCLOSURE

This invention relates to a process for the continuous production of propyloxylated alcohols by (a) Continuously passing a mixture of organic compounds having reactive hydrogen atoms selected from the group consisting of alcohols, phenols, addition products of ethylene oxide thereof and addition products of propylene oxide thereof, with propylene oxide in a molar ratio of 1:1 to 1:4 in the presence of the usual propyloxylation catalysts under a pressure at which the reaction mixture is kept in liquid form, through a jacketed reactor having a small cross-section compared to its length, (b) Heating said mixture to such a degree that after traveling through the first half of said jacketed reactor, a temperature of about 170° to 260° C. is attained, and that in the second half of said jacketed reactor said mixture passes through a maximum temperature of between about 260° to 350° C., (c) Maintaining said mixture in said jacketed reactor for about 8 to 150 seconds, (d) Maintaining the interval between the obtention of said maximum temperature and the time said mixture leaves said jacketed reactor between about 5% to 30% of the total duration of time said mixture is maintained in said jacketed reactor, (e) Cooling said propyloxylated alcohol to a temperature below 180° C. after said propyloxylated alcohol leaves said jacketed reactor, and (f) Recovering said propyloxylated alcohol.

CLAIM OF PRIORITY

Figure 1:
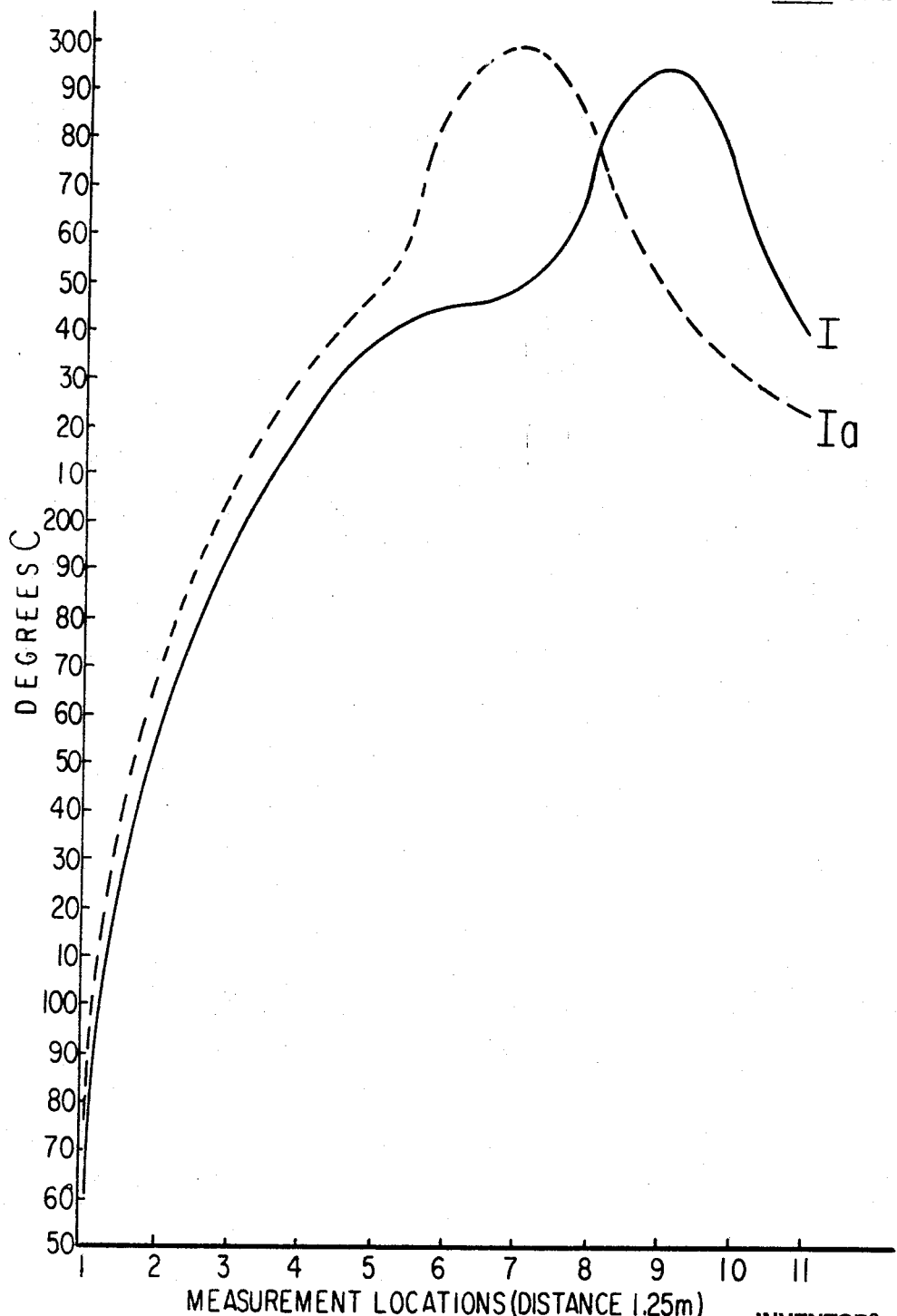
Figure 2:
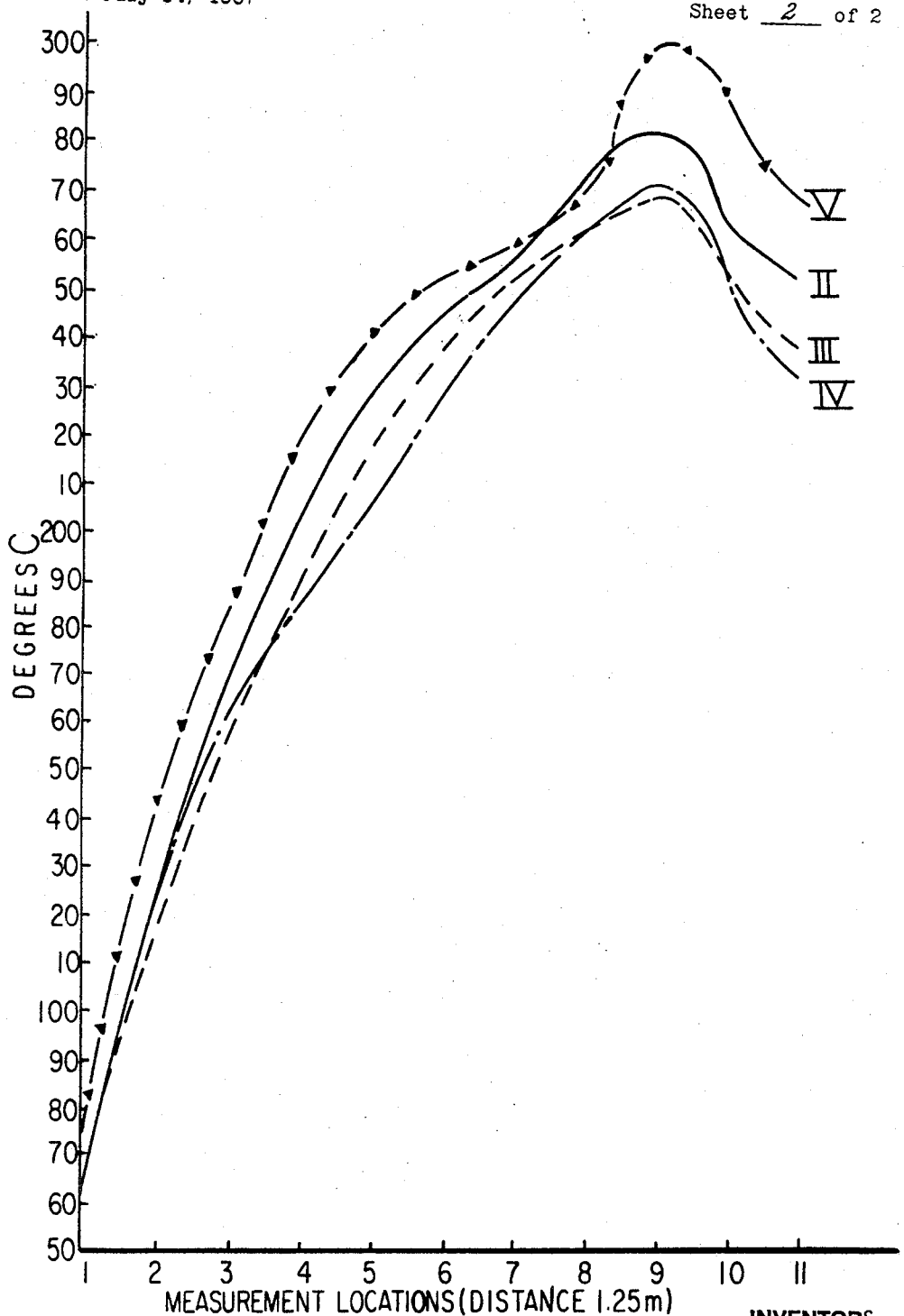

Under the provisions of 35 USC 119, the right of priority is claimed, based on the corresponding German priority application H 60,398, filed Sept. 1, 1966.

THE PRIOR ART

German Patent No. 735,418 describes a continuous process for the preparation of alkylene oxide addition products with compounds containing hydroxyl groups, which process is characterized in that the addition is carried out in a reactor tube under pressure. In particular, it is pointed out that the temperature of the heating liquid surrounding the reactor tube should not be increased beyond a specific degree, as otherwise a pronounced temperature gradient occurs in the interior of the reactor tube, thereby the desired reaction does not occur and a useless product is obtained.

To judge from the operation of Example 1 of this patent, it appears conclusive that with the addition of 10 mols of ethylene oxide to 1 mol of isooctylphenol, the reaction temperature in the pressure reactor tube increases, with a temperature of 160° C. in the heating jacket, to 350° C. due to an intensely exothermic reaction, resulting in a dark, useless product. With the addition of 5 mols of ethylene oxide per mol of alcohol, according to Example 2, the temperature of the heating jacket can be increased to 170° C. with temperatures up to 210° C. being observed in the interior of the reactor tube. As a rule, however, reaction temperatures substantially below 200° C. are used. No examples of the operation of this process for the addition of propylene oxide was given in this patent.

According to French Patent No. 947,250, a mixture of an organic hydroxyl compound, alkylene oxide and 0.01% to 1% of hexamethylenetetramine is forced through a spiral reactor tube at a temperature of about 100° C. and under a pressure which keeps the mixture in liquid form. The operating examples are limited to reactions with ethylene oxide. The reaction times given are relatively extensive, for example, 1½ hours. The reaction is incomplete.

Finally, there is described in the published German Auslegeschrift No. 1,061,764 a continuous process for the reaction of alkylene oxides with water or wtih alcohols under pressure. A reaction mixture, containing water or alcohol in excess, is passed through a pressure reactor tube. In this fashion, the addition of ethylene oxide can be carried out in relatively short reaction periods and at a comparatively high temperature. In the operation of Example 6, there are added to each one mol of octylphenol, 2 mols of ethylene oxide. The work is carried out in the presence of a large amount of an inert solvent (ethyl benzene). In the examples where the work is conducted without solvents, the ethylene oxide amounts at the most to ⅛ mol per each mol of water or of alcohol. This published Auslegeschrift likewise contains no examples for the operation of the process with propylene oxide.

The status of the prior art shows that, so far, the continuous addition of 1 mole or more of propylene oxide to organic compounds containing reactive hydrogen atoms in the presence of the usual propyloxylation catalysts at temperatures substantially exceeding 200° C. has not been met with success to obtain thereby a corresponding increase in the volume-time-yield.

OBJECTS OF THE INVENTION

An object of the present invention is the development of a process for the continuous production of addition products of propylene oxide with organic compounds having reactive hydrogen atoms comprising in combination the following steps:

(a) Continuously passing a mixture of organic compounds having reactive hydrogen atoms selected from the group consisting of alcohols, phenols, addition products of ethylene oxide thereof and addition products of propylene oxide thereof, with propylene oxide in a molar ratio of 1:1 to 1:4 in the presence of the usual propyloxylation catalysts under a pressure at which the reaction mixture is kept in liquid form, through a jacketed reactor having a small cross-section compared to its length, (b) Heating said mixture to such a degree that after traveling through the first half of said jacketed reactor, a temperature of about 170° to 260° C. is attained, and that in the second half of said jacketed reactor said mixture passes through a maximum temperature of between about 260° to 350° C., (c) Maintaining said mixture in said jacketed reactor for about 8 to 150 seconds, (d) Maintaining the interval between the obtention of said maximum temperature and the time said mixture leaves said jacketed reactor between about 5% to 30% of the total duration of time said mixture is maintained in said jacketed reactor, (e) Cooling said addition product to a temperature below 180° C. after said addition product leaves said jacketed reactor, and (f) Recovering said addition product.

Another object of the present invention is the obtention of practically colorless addition products of propylene oxide with organic compounds having reactive hydrogen atoms in high yields with very brief reaction times.

These and other objects of the invention will become more apparent as the description thereof proceeds.

DESCRIPTION OF THE INVENTION

It was startling to discover now that with very short duration periods of reaction and at reaction temperatures, the maximum of which substantially exceeds 200° C., high-grade, mostly water-clear an dnearly odorless products having a small content of byproducts were obtainable on continuously reacting propylene oxide with organic compounds having reactive hydrogen atoms, provided the following conditions are observed:

(a) Alcohols, phenols or addition products of ethylene oxide or of propylene oxide to the compounds mentioned are passed with propylene oxide in a molar ratio of 1:1 to 1:4 under a pressure which maintains the reaction mixture in liquid form and in the presence of the usual propyloxylation catalysts, through reactors with a small cross-section compared to the length, which are enclosed in a heat exchanger.

(b) The mixture is heated in a manner that, after traveling through the first half of the zone of the reactor enclosed in the heat exchanger, a temperature of between about 170° to about 260° C. is attained and that in the second half of this zone the mixture attains a maximum temperature of between about 260° and 350° C.

(c) The duration of passage of the reaction mixture through the zone of the reactor surrounded by the heat exchanger amounts to about 8 to 150 seconds, preferably 15 to 80 seconds.

(d) The time interval between attaining the maximum temperature in the reaction mixture and leaving the zone of the reactor surrounded by the heat exchanger does not amount to more than 5 to 30% of the entire duration of the passage of the reaction mixture through the reaction zone.

(e) Immediately after leaving the zone of the recator surrounded by the heat exchanger, the product is cooled to a temperature below 180° C., preferably below 150° C.

In the drawings, FIGURES I and II show the reaction temperature curves of the various examples.

Serving as starting substances for the process of the invention are mono- or multihydric aliphatic or cycloaliphatic alcohols, which may be straight or branched, primary or secondary alcohols, and which may contain also one or several double bonds. Preferable are higher primary alcohols with 6 to 22 carbon atoms. Known examples for these alcohols are the fatty alcohols, oxoalcohols, secondary alkanols or products prepared from ethylene according to the Ziegler process. Preferable are primary alkanols and alkenols having from 6 to 22 carbon atoms.

Other suitable starting materials are phenols, in particular, alkylphenols, preferably containing 4 to 18 carbon atoms in the alkyl radical, which may be straight or branched.

The addition products of ethylene oxide or propylene oxide to the compounds mentioned above may also be used as starting substances. Propylene oxide addition products are secondary alcohols.

Since the process is not adaptable for the addition of essentially more than 4 mols of propylene oxide in one process step, it is advantageous to add greater amounts of propylene oxide not at one time but in two or even more steps. By this process, the reaction product of the first step serves as starting substance for the next step.

For the process of the invention the usual propyloxylation catalysts are employed, for example, the alkaline catalysts such as alkali metal hydroxides, such as sodium or potassium hydroxide, alkali metal alkanolates or phenolates, or alkali metals such as metallic sodium or potassium. As a rule, as is customary, the amount of the catalyst ranges between 0.01% to 1.5%, preferably between 0.1% to 0.6% by weight of the alklai metal, based on the weight of the starting compounds to which propylene oxide is to be added. It is of advantage to use anhydrous catalysts and, in the case of using caustic alkalis, to remove the water formed during the formation of the alcoholate from the mixture. Furthermore, it is advantageous when using alkali alcoholates of lower alcohols, to distill the latter prior to the reaction with propylene oxide. The process of the invention, however, can also be executed in the presence of the usual acidic catalysts as, for example, boron trifluoride, tin tetrachloride or antimony pentachloride.

The pressure in the reactor should be selected so that the reaction mixture will always be in liquid form even at the elevated reaction temperatures of the invention. The pressure ranges advantageously between 50 and 100 atmospheres.

The reaction is conducted in reaction vessels which have a small cross-section in comparison with their length. For example, pressure tubes having a diameter of about 3 to 12 mm., preferably of about 5 to 10 mm., are suitable. Instead of these tubes, so-called slit-ring reactors may be used or reactors with an oval cross-section of an oblate form chosen at random. In any case, the reaction vessels should be of such a dimension as to render a sufficient heat exchange possible.

The length of the reactors at identical throughput in view of the short duration of reaction periods may be smaller than indicated in the process of the German Patent No. 735,418. It may amount, for example, to 10 to 100 meters when a tubular reactor is used.

The specific reaction zone is encircled by a heat exchanger which, on the one hand, renders a rapid heating of the reaction mixture possible and which, on the other hand, guarantees a sufficiently rapid evolution of the heat developed after the extensively exothermic reaction has started. The heat exchanger may be subdivided into several zones adjusted to various temperatures. However, this measure is not absolutely necessary. It has been found advantageous to use a single zoned heat exchanger. This can be filled with water and adjusted to the desired temperature by means of regulation by pressure. In this manner, due to the high heat of evaporation of the water, a specially effective cooling is attained. Instead of water, however, different media may be employed. The temperature of the heat exchanger is, as a rule, maintained between about 160° and 240° C.

The progress of the heat during the reaction in a specific apparatus can be controlled by the temperature of the heat exchanger, by the flow rate of the reaction mixture through the reactor and by the type and amount of the catalyst chosen. It should be taken into consideration that the development of heat of the reaction mixture is considerably accelerated in proportion to the increasing propylene oxide content of the reaction mixture. Likewise, at identical molecular ratios more heat is liberated during the reaction of low molecular weight starting substances with propylene oxide at identical reaction volumes than when high molecular weight starting substances are used.

Since, in general, the starting material, the amount of propylene oxide added and the catalyst amount are fixed, and since the reaction follows a known temperature progress, the temperature progress of the reaction can easily be adjusted by regulating either the flow rate, or the duration of passage of the reaction mixture through the reactor, and the temperature in the heat exchanger or both. For this purpose it is only necessary to measure the reaction temperatures in the various sections of the reaction vessel and to adjust either the flow rate or the temperature in the heat exchanger or boh to effect the optimum continuous reaction.

The reaction mixture is first heated in such a manner that in the first half of the zone of the reactor, encircled by the heat exchanger, a reaction temperature of between 170° to 260° C. is attained. The temperature of the heat exchanger is controlled in such a way that the reaction mixture in the second half of this zone attains a maximum temperature between about 260° and 350° C. and thereafter the reaction mixture is cooled.

It may be of adavntage to preheat the starting products either separately or combined as a mixture. The flow rate is regulated in such a way that the duration of passage of said mixture through the reaction zone lasts about 8 to 150 seconds, preferably 15 to 80 seconds. Attention should be paid to the fact that with increased temperatures in the heat exchanger, the duration of passage of the reaction mixture therethrough has to be shortened.

The progress of the reaction of the reactants can easily be followed by determining the course of the curve of the internal temperature of the reactants in the reactor by the measuring of temperatures at various points over the length of the reactor. It has been discovered that an optimal yield of pure, light-colored and odorless end product is obtained when the product passage in the reaction zone between the time of attaining the maximum temperature and of leaving the heated zone does not amount to more than about 5 to 30% of the total duration of passage of the reactants through the reaction zone.

Furthermore, it is essential to cool the reaction product immediately after leaving the heated zone to temperatures below 180° C., preferably below 150° C. otherwise an increasing discoloration of the product is noted.

Reaction products having an excellent quality are obtained with a high area-time yield, although the reaction is conducted at temperatures of such a high degree that, until now, were considered impossible for the realization of end products substantially free of byproducts. The products obtained may be utilized as textile assistants or as raw materials for the preparation of liquid or solid washing and cleansing agents.

The following examples are illustrative of the invention and enable better comprehension thereof. They are not, however, to be deemed limitative in any degree.

EXAMPLES

The examples described in the following were conducted in a reactor coil, the pressure tube of which had a diameter of 9 mm. and a length of 12.5 meters. It was provided with temperature gauges every 1.25 meters of tube length to measure the interior temperature of the reactor. The temperature in the heat exchanger surrounding the reactor coil and filled with water was regulated in that the desired pressure was adjusted with the aid of a pressure relief valve. The reaction heat was eliminated by evaporation of the water. The vapor, escaping through the said valve, was condensed in a cooling device under normal pressure; then it was pumped back into the apparatus in such a manner that the water level in the pressure jacket remained constant. The water level was adjusted so that the entire reactor coil was always surrounded by water, otherwise the heat transmission would not be sufficient. To bring the mixture of the compound containing hydroxy groups and propylene oxide, fed into the reactor, to the reaction temperature at the most rapid rate possible, the water having been condensed during the circulation was pre-heated, and additional heat was supplied to the pressure cooler by a steam coil therein heated with vapor.

The installation of a circulating pump in the system of the heat exchanger of the water under pressure proved to be of great advantage insofar as the temperature of the water present in the first half of the zone of the reactor, due to a continuous supply of raw starting material, slowly decreased and it is pumped into that part of the heat exchanger where the highest temperatures are present and are produced by exothermic reaction in order to maintain the most uniform temperature within the heat exchanger.

For the purpose of preparing the reaction mixture, the compound containing hydroxy groups admixed with the catalyst and propylene oxide were passed, directly prior to being fed into the reactor at a constant pressure between about 50 and 100 atmospheres, through separate pipes into a mixing chamber by means of suitable dosing pumps, and the components were thoroughly admixed in the said chamber. In the case of high throughputs, the compound containing hydroxyl groups was pre-heated to about 120° C.

The finished reaction product was cooled in a compression cooler to below 180° C., preferably below 150° C., and was released into an evaporation vessel.

Example 1

Lauryl alcohol was admixed with such an amount of a sodium methylate solution that the alcohol, after the methanol had been removed by evaporation under vacuum at 80° to 100° C. contained 0.3% by weight of sodium. The catalyst-containing alcohol and propylene oxide, at a molar ratio of 1 to 2, weight ratio of 1.6 to 1, were pumped through the previously described reactor at such a rate that in quantitative reaction 87 kg. of an addition product of 2 mols of propylene oxide to 1 mol of lauryl alcohol were produced per hour. The vapor pressure in the heat exchanger was adjusted to 26 atmospheres, corresponding to a temperature of 225° C., and the pressure present in the reactor coil was adjusted to 80 to 90 atmospheres. The maximum temperature attained by the reaction mixture in the reactor was 295° C. and the duration of passage of the product through the reactor lasted about 27 seconds. The practically clear product (Lovibond values in a 4″ cuvette: yellow=1.2; red=0.3; blue=0) had a propylene oxide content of 36.5%. In addition, 1.7% of polypropylene glycol were obtained. The temperature progress of the reaction is given in curve I of FIGURE I.

A change of the vapor pressure in the heat exchanger to 31.5 atmospheres, corresponding to a temperature of 236° C., effected the premature obtention of a maximum temperature of 299° C. and produced, as anticipated, a product of dark color. The temperature progress of the reaction is shown in curve Ia of FIGURE I.

This negative comparison example shows that an optimal yield of a high-grade product can be obtained only when the time interval between attaining the maximum temperature and the product leaving the heated zone of the reactor does not amount to more than about 30% of the total duration of passage of the reactants through the reactor.

Example 2

A slightly yellow oleyl alcohol was admixed with such an amount of a sodium methylate solution that the alcohol, after the methanol had been removed by evaporation under vacuum at 80° to 100° C., contained 0.4% by weight of sodium. The catalyst-containing alcohol and propylene oxide, at a molar ratio of 1 to 2, weight ratio of 2.3 to 1, were pumped through the previously described reactor at such a rate that in quantitative reaction 92.7 kg. of an addition product of 2 mols of propylene oxide to 1 mol of oleyl alcohol were produced per hour. The vapor pressure in the heat exchanger was adjusted to 28.4 atmospheres, corresponding to a temperature of 230° C., and the pressure present in the reactor coil was adjusted to 60 to 80 atmospheres. The maximum temperature attained by the reaction mixture in the reactor amounted to 282° C., and the duration of passage of the product through the reactor lasted about 25 seconds. The yellowish product (Lovibond values in a 4″ cuvette:

yellow=9.5; red=0.4; blue=0) had a propylene oxide content of 29.0%. In addition, 2.9% of polypropylene glycol were obtained. The temperature progress of the reaction is shown in curve II of FIGURE II.

Example 3

An addition product of 2 mols of ethylene oxide to a $C_{12}$ to $C_{14}$ fatty alcohol mixture was admixed with such an amount of a sodium methylate solution that the ethylene oxide adduct, after the methanol had been removed by evaporation under vacuum at 80° to 100° C., contained 0.4% by weight of sodium. The catalyst-containing addition product and propylene oxide, at a molar ratio of 1 to 2, weight ratio of 2.4 to 1, were pumped through the said reactor at such a rate that in quantitative reaction 100.5 kg. of an addition product of 2 mols of propylene oxide to 1 mol of the starting ethylene oxide adduct were produced per hour. The vapor pressure in the heat exchanger was adjusted to 20.2 atmospheres, corresponding to 212° C., and the pressure present in the reactor coil was adjusted to 65 to 70 atmospheres. The maximum temperature attained by the reaction mixture in the reactor amounted to 269° C. and, the duration of passage of the product through the reactor lasted about 25 seconds. The clear product (Lovibond values in a 4″ cuvette: yellow=2.0; red=0.1; blue=0) had a propylene oxide content of 30.0%. In addition, 1.7% of polypropylene glycol were obtained. The temperature progress of the reaction is shown in curve III of FIGURE II.

Example 4

An addition product of 2 mols of ethylene oxide to a $C_{12}$ to $C_{14}$ fatty alcohol mixture was admixed with such an amount of a sodium methylate solution that the ethylene oxide adduct, after the methanol had been removed by evaporation under vacuum at 80° to 100° C., contained 0.4% by weight of sodium. The catalyst-containing addition product and propylene oxide were, at a molar ratio of 1:3, weight ratio of 1.6 to 1, pumped through the previously described reactor at such a rate that in quantitative reaction 86.6 kg. of the adduct of 3 mols of propylene oxide to 1 mol of the starting ethylene oxide adduct were produced per hour. The vapor pressure in the heat exchanger was adjusted to 16.0 atmospheres, corresponding to a temperature of 197° C., and the pressure present in the reactor coil was adjusted to 75 to 85 atmospheres. The maximum temperature attained by the reaction mixture in the reactor amounted to 272° C. and the duration of passage of the product through the reactor lasted about 33 seconds. The clear product (Lovibond values in a 4″ cuvette: yellow=3.1; red=0.2; blue=0) had a propylene oxide content of 39.5%. As by-product, 2.4% of polypropylene glycol were obtained. The temperature progress of the reaction is shown in curve IV of FIGURE II.

Example 5

Nonylphenol was admixed with such an amount of a sodium methylate solution that the nonyl phenol, after the methanol had been removed by evaporation under vacuum at 80° C. to 100° C., contained 0.4% by weight of sodium. The catalyst-containing nonylphenol and propylene oxide were pumped, at a molar ratio of 1 to 2, weight ratio of 1.9 to 1, at such a rate through the previously described reactor, that in quantitative reaction 71.2 kg. of an addition product of 2 mols of propylene oxide to 1 mol of nonylphenol were produced per hour. The vapor pressure in the heat exchanger was adjusted to 32.0 atmospheres, corresponding to a temperature of 239° C., and the pressure present in the reactor coil was adjusted to 75 to 85 atmospheres. The maximum temperature attained by the reaction mixture in the reactor amounted to 301° C., and the duration of passage of the product through the reactor lasted about 37 seconds. The slightly yellow product (Lovibond values in a 4″ cuvette: yellow=5.6; red=0.3; blue=0) had a propylene oxide content of 35.0%. In addition, 0.8% of polypropylene glycol were obtained. The temperature progress of the reaction is shown in curve V of FIGURE II.

The foregoing specific embodiments are illustrative of the invention. It is to be understood, however, that other expedients known to those skilled in the art may be employed.

We claim:

1. A process for the continuous production of addition products of propylene oxide with organic compounds having reactive hydrogen atoms comprising in combination the following steps: (a) continuously passing a mixture of organic compounds having reactive hydrogen atoms selected from the group consisting of alcohols, phenols, addition products of ethylene oxide thereof and addition products of propylene oxide thereof, with propylene oxide in a molar ratio of organic compound with reactive hydrogen atoms to propylene oxide of 1:1 to 1:4 in the presence of a propyloxylation catalyst under a pressure at which the reaction mixture is kept in liquid form, through a jacketed reactor having a small cross-section compared to its length, (b) heating said mixture to such a degree that, after travelling through the first half of said jacketed reactor, a temperature of about 170° C. to 260° C. is attained, and that in the second half of said jacketed reactor said mixture passes through a maximum temperature of between about 260° C. to 350° C., (c) maintaining said mixture in said jacketed reactor for about 8 to 150 seconds, (d) maintaining the interval between the obtention of said maximum temperature and the time said mixture leaves said jacketed reactor between about 5% to 30% of the total duration of time said mixture is maintained in said jacketed reactor, (e) cooling said addition product to a temperature below 180° C. immediately after said addition product leaves said jacketed reactor, and (f) recovering said addition product.

2. The process of claim 1, step (c), wherein said mixture is maintained in said jacketed reactor for between about 15 to 80 seconds.

3. The process of claim 1, step (e), wherein said addition product is immediately cooled to a temperature below 150° C. after said addition product leaves said jacketed reactor.

4. The process of claim 1 wherein said organic compound having reactive hydrogen atoms is a primary alkanol having 6 to 22 carbon atoms.

5. The process of claim 1 wherein said organic compound having reactive hydrogen atoms is a primary alkenol having 6 to 22 carbon atoms.

6. The process of claim 1 wherein said organic compound having reactive hydrogen atoms is an alkylphenol having 4 to 18 carbon atoms in the alkyl.

7. The process of claim 1 wherein said organic compound having reactive hydrogen atoms is an ethoxylated primary alkanol having 6 to 22 carbon atoms.

References Cited

FOREIGN PATENTS 652,512  11/1962  Canada.
1,061,764  7/1959  Germany.
757,309  9/1956  Great Britain.

BERNARD HELFIN, *Primary Examiner.*

U.S. Cl. X.R.

260—611, 615